United States Patent
He et al.

(10) Patent No.: US 12,223,269 B2
(45) Date of Patent: Feb. 11, 2025

(54) LANGUAGE-MODEL PRETRAINING WITH GRADIENT-DISENTANGLED EMBEDDING SHARING

(71) Applicant: Microsoft Technology Licensing, LLC, Redmond, WA (US)

(72) Inventors: Pengcheng He, Sammamish, WA (US); Jianfeng Gao, Woodinville, WA (US); Weizhu Chen, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 240 days.

(21) Appl. No.: 17/664,031

(22) Filed: May 18, 2022

(65) Prior Publication Data

US 2023/0153532 A1     May 18, 2023

Related U.S. Application Data

(60) Provisional application No. 63/264,163, filed on Nov. 16, 2021.

(51) Int. Cl.
*G06F 40/284* (2020.01)
*G06F 40/295* (2020.01)
*G06N 3/08* (2023.01)
*G06N 5/04* (2023.01)

(52) U.S. Cl.
CPC .......... *G06F 40/284* (2020.01); *G06F 40/295* (2020.01); *G06N 3/08* (2013.01); *G06N 5/04* (2013.01)

(58) Field of Classification Search
CPC .................................. G06N 3/08; G06N 5/04
See application file for complete search history.

(56) References Cited

U.S. PATENT DOCUMENTS

| | | | |
|---|---|---|---|
| 2021/0174784 A1* | 6/2021 | Min | G06N 3/08 |
| 2022/0262377 A1* | 8/2022 | Park | G10L 25/60 |

OTHER PUBLICATIONS

Clark, Kevin; Luong, Minh-Thang; Le, Quoc V.; Manning, Christopher D., "ELECTRA: Pre-training text encoders as discriminators rather than generators", Mar. 2020, ICLR 2020 (Year: 2020).*

(Continued)

*Primary Examiner* — Hai Phan
*Assistant Examiner* — Alexander Joongie Kim
(74) *Attorney, Agent, or Firm* — Alleman Hall & Tuttle LLP

(57) ABSTRACT

A method for training a language model comprises (a) receiving vectorized training data as input to a multitask pretraining problem; (b) generating modified vectorized training data based on the vectorized training data, according to an upstream data embedding; (c) emitting pretraining output based on the modified vectorized training data, according to a downstream data embedding equivalent to the upstream data embedding; and (d) adjusting the upstream data embedding and the downstream data embedding by computing, based on the pretraining output, a gradient of the upstream data embedding disentangled from a gradient of the downstream data embedding, thereby advancing the multitask pretraining problem toward a pretrained state.

20 Claims, 8 Drawing Sheets

(56) References Cited

OTHER PUBLICATIONS

Zhu, et al., "Aligning Books and Movies: Towards Story-Like Visual Explanations by Watching Movies and Reading Books", In Proceedings of the IEEE International Conference on Computer Vision, Dec. 2015, pp. 19-27.

Vaswani, et al., "Attention is all you Need", In Proceedings of 31st Conference on Neural Information Processing Systems, Dec. 2017, 11 Pages.

Wang, et al., "GLUE: A Multi-Task Benchmark and Analysis Platform for Natural Language Understanding", In Proceedings of 7th International Conference on Learning Representations, Feb. 23, 2019, 20 Pages.

Wang, et al., "MiniLM: Deep Self-Attention Distillation for Task-Agnostic Compression of Pre-Trained Transformers", In Repository of arXiv:2002.10957v1, Feb. 25, 2020, 14 Pages.

Wang, et al., "MiniLMv2: Multi-Head Self-Attention Relation Distillation for Compressing Pretrained Transformers", In Repository of arXiv:2012.15828v1, Dec. 31, 2020, 10 Pages.

Wang, et al., "SuperGLUE: A Stickier Benchmark for General-Purpose Language Understanding Systems", In Proceedings of the 33rd International Conference on Neural Information Processing Systems, Dec. 2019, 15 Pages.

Warstadt, et al., "Neural Network Acceptability Judgments", In Repository of arXiv:1805.12471v1, May 31, 2018, 15 Pages.

Williams, et al., "A Broad-Coverage Challenge Corpus for Sentence Understanding through Inference", In Proceedings of the Conference of the North American Chapter of the Association for Computational Linguistics: Human Language Technologies, vol. 1 (Long Papers), Jun. 1, 2018, pp. 1112-1122.

Xue, et al., "mT5: A Massively Multilingual Pre-trained Text-to-Text Transformer", In Proceedings of the Conference of the North American Chapter of the Association for Computational Linguistics: Human Language Technologies, Jun. 6, 2021, pp. 483-498.

Yang, et al., "XLNet: Generalized Autoregressive Pretraining for Language Understanding", In Proceedings of 33rd Conference on Neural Information Processing Systems, Dec. 2019, 11 Pages.

Zellers, et al., "SWAG: A Large-Scale Adversarial Dataset for Grounded Commonsense Inference", In Proceedings of the Conference on Empirical Methods in Natural Language Processing, Oct. 31, 2018, pp. 93-104.

Zhang, et al., "ReCoRD: Bridging the Gap between Human and Machine Commonsense Reading Comprehension", In Repository of arXiv:1810.12885v1, Oct. 30, 2018, 14 Pages.

"Microsoft / DeBERTa", Retrieved from: https://github.com/microsoft/DeBERTa/tree/master/experiments/, Jan. 2020, 1 Page.

"Models", Retrieved from: https://huggingface.co/models?other-deberta-v3, Retrieved on: Mar. 15, 2022, 2 Pages.

"Tensorflow / Models", Retrieved from: https://web.archive.org/web/20180613101354/https://github.com/tensorflow/models/tree/master/research/lm_commonsense, Retrieved on: May 2, 2020, 4 Pages.

Bentivogli, et al., "The Fifth PASCAL Recognizing Textual Entailment Challenge", In Proceedings of the Second Text Analysis Conference, Nov. 17, 2009, 15 Pages.

Brown, et al., "Language Models are Few-Shot Learners", In Repository of arXiv:2005.14165v1, May 18, 2020, 72 Pages.

Cer, et al., "SemEval-2017 Task 1: Semantic Textual Similarity—Multilingual and Cross-lingual Focused Evaluation", In Repository of arXiv:1708.00055v1, Jul. 31, 2017, 14 Pages.

Chi, et al., "XLM-E: Cross-lingual Language Model Pre-training via ELECTRA", In Repository of arXiv:2106.16138v1, Jun. 30, 2021, 12 Pages.

Clark, et al., "BoolQ: Exploring the Surprising Difficulty of Natural Yes/No Questions", In Repository of arXiv:1905.10044v1, May 24, 2019, 13 Pages.

Clark, et al., "ELECTRA: Pre-training Text Encoders as Discriminators Rather Than Generators", In Proceedings of International Conference on Learning Representations, Mar. 11, 2020, 18 Pages.

Clark, et al., "Google-Research / Electra", Retrieved from: https://github.com/google-research/electra, Apr. 1, 2021, 9 Pages.

Conneau, et al., "Unsupervised Cross-lingual Representation Learning at Scale", In Proceedings of the 58th Annual Meeting of the Association for Computational Linguistics, Jul. 5, 2020, pp. 8440-8451.

Conneau, et al., "XNLI: Evaluating Cross-lingual Sentence Representations", In Proceedings of Conference on Empirical Methods in Natural Language Processing, Oct. 31, 2018, pp. 2475-2485.

Dagan, et al., "The Pascal Recognising Textual Entailment Challenge", In Proceedings of the First International Conference on Machine Learning Challenges: Evaluating Predictive Uncertainty Visual Object Classification, and Recognizing Textual Entailment, Apr. 11, 2005, 8 Pages.

Dagan, et al., "The Second PASCAL Recognising Textual Entailment Challenge", In Proceedings of the Second PASCAL Challenges Workshop on Recognising Textual Entailment, Apr. 2006, 9 Pages.

Dai, et al., "Transformer-XL: Attentive Language Models beyond a Fixed-Length Context", In Proceedings of the 57th Annual Meeting of the Association for Computational Linguistics, Jul. 28, 2019, pp. 2978-2988.

Devlin, et al., "BERT: Pre-training of Deep Bidirectional Transformers for Language Understanding", In Proceedings of the Conference of the North American Chapter of the Association for Computational Linguistics: Human Language Technologies, vol. 1 (Long and Short Papers), Jun. 2, 2019, pp. 4171-4186.

Dolan, et al., "Automatically Constructing a Corpus of Sentential Paraphrases", In Proceedings of the Third International Workshop on Paraphrasing, Jan. 2005, pp. 9-16.

Fedus, et al., "Switch Transformers: Scaling to Trillion Parameter Models with Simple and Efficient Sparsity", In Repository of arXiv:2101.03961v1, Jan. 11, 2021, 31 Pages.

Giampiccolo, et al., "The Third PASCAL Recognizing Textual Entailment Challenge", In Proceedings of the ACL-PASCAL Workshop on Textual Entailment and Paraphrasing, Jun. 2007, 9 Pages.

Gokaslan, Aaron, "Publications", Retrieved from: https://skylion007.github.io/, Retrieved on: Mar. 15, 2022, 2 Pages.

Hadsell, et al., "Embracing Change: Continual Learning in Deep Neural Networks", In Journal of Trends in Cognitive Sciences, vol. 24, Issue 12, Dec. 2020, pp. 1028-1040.

HHe, et al., "Deberta: Decoding-Enhanced Bert with Disentangled Attention", In Proceedings of International Conference on Learning Representation, Sep. 28, 2020, 21 Pages.

He, et al., "DeBERTaV3: Improving DeBERTa using ELECTRA-Style Pre-Training with Gradient-Disentangled Embedding Sharing", In Repository of arXiv:2111.09543v2, Dec. 8, 2021, 16 Pages.

Huang, et al., "Music Transformer: Generating Music with Long-Term Structure", Retrieved from: https://magenta.tensorflow.org/music-transformer#:~:text=Generating%20long%20pieces%20of%20music,with%20improved%20long%2Dterm%20coherence., Dec. 13, 2018, 8 Pages.

Jiao, et al., "TinyBERT: Distilling BERT for Natural Language Understanding", In Repository of arXiv:1909.10351v1, Sep. 23, 2019, 13 Pages.

Kanakarajan, et al., "Small-Bench NLP: Benchmark for Small Single GPU Trained Models in Natural Language Processing", In Repository of arXiv:2109.10847v1, Sep. 22, 2021, 5 Pages.

Khashabi, et al., "Looking Beyond the Surface: A Challenge Set for Reading Comprehension over Multiple Sentences", In Proceedings of the Conference of the North American Chapter of the Association for Computational Linguistics: Human Language Technologies, vol. 1 (Long Papers), Jun. 2018, pp. 252-262.

Kingma, et al., "Adam: A Method for Stochastic Optimization", In Repository of arXiv:1412.6980v1, Dec. 22, 2014, 9 Pages.

Kiyono, Shun, "Butsugiri / Homemade_Bookcorpus", Retrieved from: https://github.com/butsugiri/homemade_bookcorpus, Jul. 22, 2018, 3 Pages.

Kudo, Taku, "Subword Regularization: Improving Neural Network Translation Models with Multiple Subword Candidates", In Proceedings of the 56th Annual Meeting of the Association for Computational Linguistics (vol. 1: Long Papers), Jul. 15, 2018, pp. 66-75.

(56) References Cited

OTHER PUBLICATIONS

Kumar, et al., "Microsoft / DeBERTa", Retrieved from: https://github.com/microsoft/DeBERTa, Jan. 2020, 11 Pages.

Lai, et al., "RACE: Large-scale Reading Comprehension Dataset From Examinations", In Proceedings of the Conference on Empirical Methods in Natural Language Processing, Sep. 2017, pp. 785-794.

Lan, et al., "ALBERT: A Lite BERT for Self-Supervised Learning of Language Representations", In Proceedings of International Conference on Learning Representations, Sep. 26, 2019, 17 Pages.

Levesque, et al., "The Winograd Schema Challenge", In Proceedings of Thirteenth International Conference on the Principles of Knowledge Representation and Reasoning, May 17, 2012, pp. 552-561.

Liu, et al., "On the Variance of the Adaptive Learning Rate and Beyond", In Proceedings of International Conference on Learning Representations, Sep. 26, 2019, 13 Pages.

Loshchilov, et al., "Fixing Weight Decay Regularization in Adam", In Proceedings of International Conference on Learning Representations, Feb. 16, 2018, 14 Pages.

Meng, et al., "COCO-LM: Correcting and Contrasting Text Sequences for Language Model Pretraining", In Repository of arXiv:2102.08473v1, Feb. 16, 2021, 13 Pages.

Nagel, Sebastian, "Cc-News", Retrieved from: https://commoncrawl.org/2016/10/news-dataset-available/, Oct. 4, 2016, 3 Pages.

Ott, et al., "RoBERTa: A Robustly Optimized BERT Pretraining Approach", In Repository of arXiv:1907.11692v1, Jul. 26, 2019, 13 Pages.

Pilehvar, et al., "WiC: The Word-in-Context Dataset for Evaluating Context-Sensitive Meaning Representations", In Proceedings of the Conference of the North American Chapter of the Association for Computational Linguistics: Human Language Technologies, vol. 1 (Long and Short Papers), Jun. 2, 2019, pp. 1267-1273.

Radford, et al., "Language Models are Unsupervised Multitask Learners", In Journal of OpenAI blog, vol. 1, Issue 8, Feb. 24, 2019, 24 Pages.

Raffel, et al., "Exploring the Limits of Transfer Learning with a Unified Text-to-Text Transformer", In Journal of Machine Learning Research, vol. 21, Issue 140, Jun. 2020, 67 Pages.

Rajpurkar, et al., "Know What You Don't Know: Unanswerable Questions for SQuAD", In Proceedings of the 56th Annual Meeting of the Association for Computational Linguistics (vol. 2: Short Papers), Jul. 15, 2018, pp. 784-789.

Rajpurkar, et al., "SQuAD: 100,000+ Questions for Machine Comprehension of Text", In Proceedings of the Conference on Empirical Methods in Natural Language Processing, Nov. 2016, pp. 2383-2392.

Sennrich, et al., "Neural Machine Translation of Rare Words with Subword Units", In Proceedings of the 54th Annual Meeting of the Association for Computational Linguistics (vol. 1: Long Papers), Aug. 7, 2016, pp. 1715-1725.

Shaw, et al., "Self-Attention with Relative Position Representations", In Proceedings of the Conference of the North American Chapter of the Association for Computational Linguistics: Human Language Technologies, vol. 2 (Short Papers), Jun. 1, 2018, pp. 464-468.

Shoeybi, et al., "Megatron-LM: Training Multi-Billion Parameter Language Models Using GPU Model Parallelism", In Repository of arXiv:1909.08053v1, Sep. 17, 2019, 15 Pages.

Simons, et al., "The CommitmentBank: Investigating projection in naturally occurring discourse", In Proceedings of Sinn und Bedeutung, vol. 23, Issue 2, Jul. 25, 2019, pp. 107-124.

Socher, et al., "Recursive Deep Models for Semantic Compositionality Over a Sentiment Treebank", In Proceedings of the Conference on Empirical Methods in Natural Language Processing, Oct. 18, 2013, pp. 1631-1642.

Trinh, et al., "A Simple Method for Commonsense Reasoning", In Repository of arXiv:1806.02847v1, Jun. 7, 2018, 12 Pages.

Pizzati, et al., "Model-based Disentanglement of Lens Occlusions", In Repository of arXiv:2004.01071v1, Apr. 2, 2020, 17 Pages.

Guo, et al., "Phonetic Posteriorgrams based Many-to-Many Singing Voice Conversion via Adversarial Training", In Repository of arXiv:2012.01837v1, Dec. 3, 2020, 8 Pages.

Hu, et al., "Toward Controlled Generation of Text", In Repository of arXiv:1703.00955v4, Sep. 13, 2018, 10 Pages.

"International Search Report and Written Opinion Issued in PCT Application No. PCT/US22/043564", Mailed Date: Dec. 21, 2022, 9 Pages.

\* cited by examiner

LANGUAGE-MODEL PRETRAINING WITH GRADIENT-DISENTANGLED EMBEDDING SHARING

CROSS REFERENCE TO RELATED APPLICATION

This application claims priority to U.S. Provisional Patent Application Ser. No. 63/264,163 filed 16 Nov. 2021 and entitled PRE-TRAINED LANGUAGE MODEL, the entirety of which is hereby incorporated herein by reference, for all purposes.

BACKGROUND

Natural-language understanding (NLU) based on machine learning is a recent achievement in computer science. Instead of relying on deterministic algorithms to interpret textual representations of human language, state-of-the-art methods employ trained neural networks or other forms of artificial intelligence (AI), which incrementally decode the representations to reveal and act upon their underlying semantic content. Despite the broad applicability of this approach, the process of training AI constructs for NLU may be extremely computationally expensive. It is not uncommon for a language model to be trained on a vast corpus of language input, such as the entire content of an encyclopedia. Accordingly, training efficiency features importantly in the development of a successful language-processing service.

SUMMARY

One aspect of this disclosure relates to a language-processing service configured for natural language understanding (NLU). The language-processing service includes a language model having upstream and downstream sequences of transformer blocks, an input module configured to convey language input to the language-processing model, and an output module configured to expose an output of the language-processing model. The upstream sequence of transformer blocks is configured to receive vectorized training data and emit modified vectorized training data during pretraining; the downstream sequence of transformer blocks is configured to receive the modified vectorized training data and emit pretraining output during the pretraining. The upstream sequence of transformer blocks includes an upstream data embedding, and the downstream sequence of transformer blocks includes an equivalent, downstream data embedding. Pretraining logic operative during the pretraining is configured to adjust the upstream data embedding and the downstream data embedding by computing a gradient of the upstream data embedding disentangled from a gradient of the downstream data embedding.

Another aspect of this disclosure relates to a language-model training service configured to pretrain a language model as summarized above, wherein the upstream and downstream sequences of transformer blocks each take the form of an encoder. The language-model training service includes the language model as well as the pretraining logic.

Another aspect of this disclosure relates to a method for training a language model. The method comprises (a) receiving vectorized training data as input to a multitask pretraining problem; (b) generating modified vectorized training data based on the vectorized training data, according to an upstream data embedding; (c) emitting pretraining output based on the modified vectorized training data, according to a downstream data embedding equivalent to the upstream data embedding; and (d) adjusting the upstream data embedding and the downstream data embedding by computing, based on the pretraining output, a gradient of the upstream data embedding disentangled from a gradient of the downstream data embedding, thereby advancing the multitask pretraining problem toward a pretrained state.

This Summary is provided to introduce in simplified form a selection of concepts that are further described in the Detailed Description. This Summary is not intended to identify key features or essential features of the claimed subject matter, nor is it intended to be used to limit the scope of the claimed subject matter. The claimed subject matter is not limited to implementations that solve any disadvantages noted in any part of this disclosure.

DETAILED DESCRIPTION

Natural language understanding (NLU) is part of the broader field of natural language processing (NLP); it includes computer-implemented tasks such as automated reasoning, machine translation, question answering, natural-language inference, named-entity recognition (NER), and text summarization. Originally most NLU solutions processed strings of text according to carefully constructed deterministic algorithms based on linguistic rules. Such algorithms resolved text into sequences of semantic elements and interpreted the elements to achieve desired results. Competing with that approach were methods exploiting statistical relationships among words in vast corpora of written language to obtain NLU results probabilistically, without relying on predetermined linguistic rules. Over the last thirty years, explosive development in artificial neural networks and other machine-learning technologies enabled statistical NLU to far outpace deterministic NLU for practically every NLU task.

Figure 1:
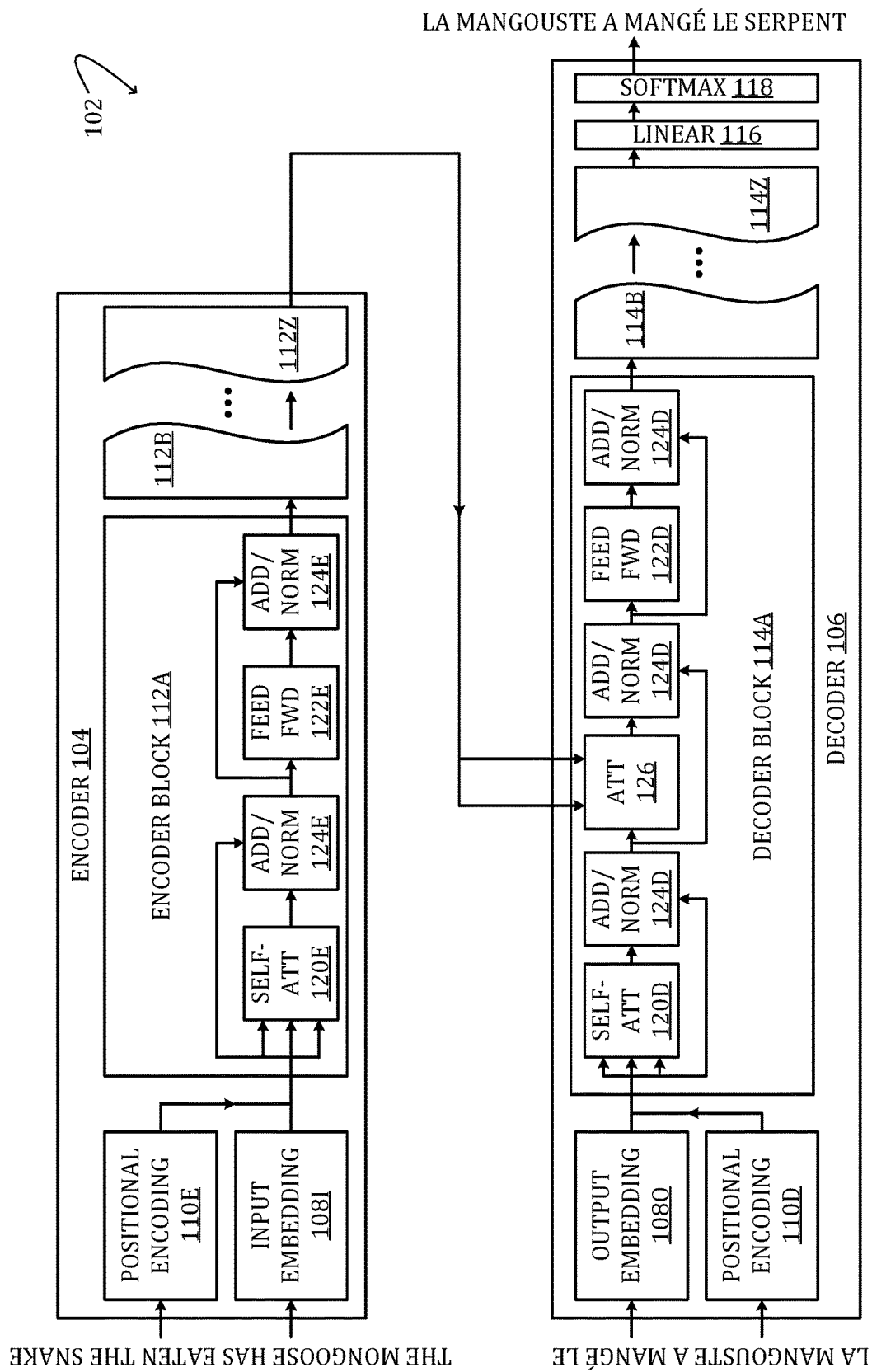
FIG. 1 is a simplified block diagram of an example transformer-based language model comprising an encoder and a decoder.

Within the last five years, research on statistical NLU has shifted focus from recurrent neural-network technology to transformer-based technology. FIG. 1 is a simplified block diagram of an example transformer-based language model 102. The language model includes encoder 104 and decoder 106, arranged in series with the encoder upstream of the decoder. The terms 'upstream' and 'downstream' refer herein to the relative position of the indicated structures with respect to the flow direction of the data exchanged by the structures. Language model 102 is configurable for various NLU tasks, including, inter alia, the NLU tasks listed above. For ease of understanding it is helpful to consider a concrete though non-limiting example in which language model 102 is configured for machine translation from English to French. In that example, encoder 104 receives English text, and decoder 106 emits French text corresponding to the English text received. More specifically, the decoder is configured to assemble the corresponding French text iteratively, by adding each appropriate subsequent word to the output text, which may contain no words initially.

To support this and other NLU tasks, encoder 104 includes input-embedding module 108I, positional-encoding module 110E, and one or more encoder blocks 112 arranged in series. Each encoder block emits a data structure called an 'encoding' based on the input it receives. Such input may include a prior encoding from the encoder block immediately to the left. Decoder 106 includes output-embedding module 108O, positional-encoding module 110D, and one or more decoder blocks 114 arranged in series. The decoder also includes a linear-transformation module 116 and a softmax module 118. Each decoder block emits a decoding based on the input it receives, which may include a decoding from the decoder block immediately to the left. In addition, the encoding emitted by the rightmost encoder block 112Z of encoder 104 is provided to at least one decoder block of decoder 106.

Referring first to encoder 104, input-embedding module 108I receives input text as a sequence of words (i.e., tokens) and emits a corresponding sequence of token vectors in an N-dimensional embedding space. The mapping from words to vectors is achieved such that the absolute distance in the embedding space between words with similar meanings is less than the absolute distance between words with dissimilar meanings.

Each encoder block 112 and each decoder block 114 of language model 102 is configured to receive and process plural input vectors non-sequentially—i.e., irrespective of the positions of the corresponding words in the input text. However, word position can affect the meanings of sentences that contain exactly the same words. 'The snake has eaten the mongoose' differs semantically from 'The mongoose has eaten the snake', for instance. In order to encode the word-position information that may affect meaning, positional-encoding module 110E is configured to add positional information to each token vector of the input. The positional bias can be implemented using absolute position embedding or relative position embedding. In some examples relative position embeddings are more effective for NLU and generation tasks.

Each encoder block 112 of language model 102 is configured to emit an encoding that reports the degree to which each token vector is relevant to other token vectors of the same encoder block. To that end, each encoder block includes a multi-head self-attention mechanism 120E and a feed-forward neural network 122E. The multi-head self-attention mechanism accepts plural input encodings and weights the relevance of each vector to another, to generate an output encoding. Feed-forward neural network 122E enacts additional processing on the output of multi-head self-attention mechanism 120E, and addition-normalization modules 124E provide residual connection and layer normalization.

Turning now to decoder 106, output-embedding module 108O and positional-encoding module 110D enact functionality analogous to that of input-embedding module 108I and positional-encoding module 110E, but on the evolving output sequence routed back as input to leftmost decoder block 114A.

Each decoder block 114 is configured to emit a decoding that augments the evolving output sequence. To that end, each decoder block receives output from the decoder block immediately to the left. In addition, at least one decoder block further incorporates contextual information from rightmost encoder block 112Z. To that end, each decoder block includes a multi-head self-attention mechanism 120D, an additional attention mechanism 126 over the encodings, and a feed-forward neural network 122D. The leftmost decoder block receives positional information and embeddings from the output sequence as input. The output sequence is partially masked to prevent upstream information flow.

Multi-head self-self-attention mechanism 120D draws information from the outputs of previous decoders (or from the output embedding). Arranged downstream of addition-normalization module 124D, the additional attention mechanism 126 draws information from the encodings as well as the previous decoding. Feed-forward neural network 122D provides a function analogous to that of feed-forward neural network 122E. Linear-transformation module 116 and softmax module 118 cooperate to select, from the output vocabulary (e.g., French), the most probable subsequent output word based on the rightmost decoding.

Transformer-based NLU offers advantages over competing technologies, such as recurrent neural networks. Some advantages relate to training speed and the ability to parallelize a language model across multiple graphics processing units (GPUs). A more fundamental advantage, however, is the modularity of the transformer encoder-decoder architecture. In effect, language model 102 is capable of resolving an end-to-end NLU task into a semantic-interpretation task, enacted by encoder 104, followed by an output-sequencing task enacted by decoder 106. In the concrete example above, the role of the encoder is to determine the meaning of the English sentence provided as input. Quite distinctly, the role of the decoder is to represent that meaning in French. It will be noted that the terms 'encoder' and 'transformer encoder' are used interchangeably herein, as are the terms 'decoder' and 'transformer decoder'.

Using transformer-based architecture it is possible, within limits, to mix-and-match separately pretrained encoders and decoders to realize different NLU objectives. For instance, decoder 106 of transformer 100, pretrained to output French, may be exchanged for a decoder pretrained to output German without having to completely retrain encoder 104. The practical caveat of that scenario is that transformer model training is typically a two-phase process, comprising an unsupervised pretraining phase followed by a supervised fine-tuning phase. The pretraining phase may be largely generic to various NLU tasks, while the fine-tuning phase may be task-specific. In some scenarios encoder 104, pretrained to interpret English, may be paired with a decoder pretrained for a task completely distinct from machine translation—e.g., text summarization in English. The advantage of modularity is significant because encoder and decoder training may be computationally expensive, involving the refinement of millions or billions of parameter values and digestion of vast corpora of text information.

The example language-model components shown in FIG. 1 should not be construed as limiting in any sense, because some transformer-based solutions lack one or more of the illustrated components. For instance, a series of linked decoder blocks with no associated encoder is the basis for 'generative pretrained transformer' (GPT) models. Likewise, a series of linked encoder blocks with no associated decoder is the basis for a 'bidirectional encoder representation from transformers' (BERT) model.

Figure 2:
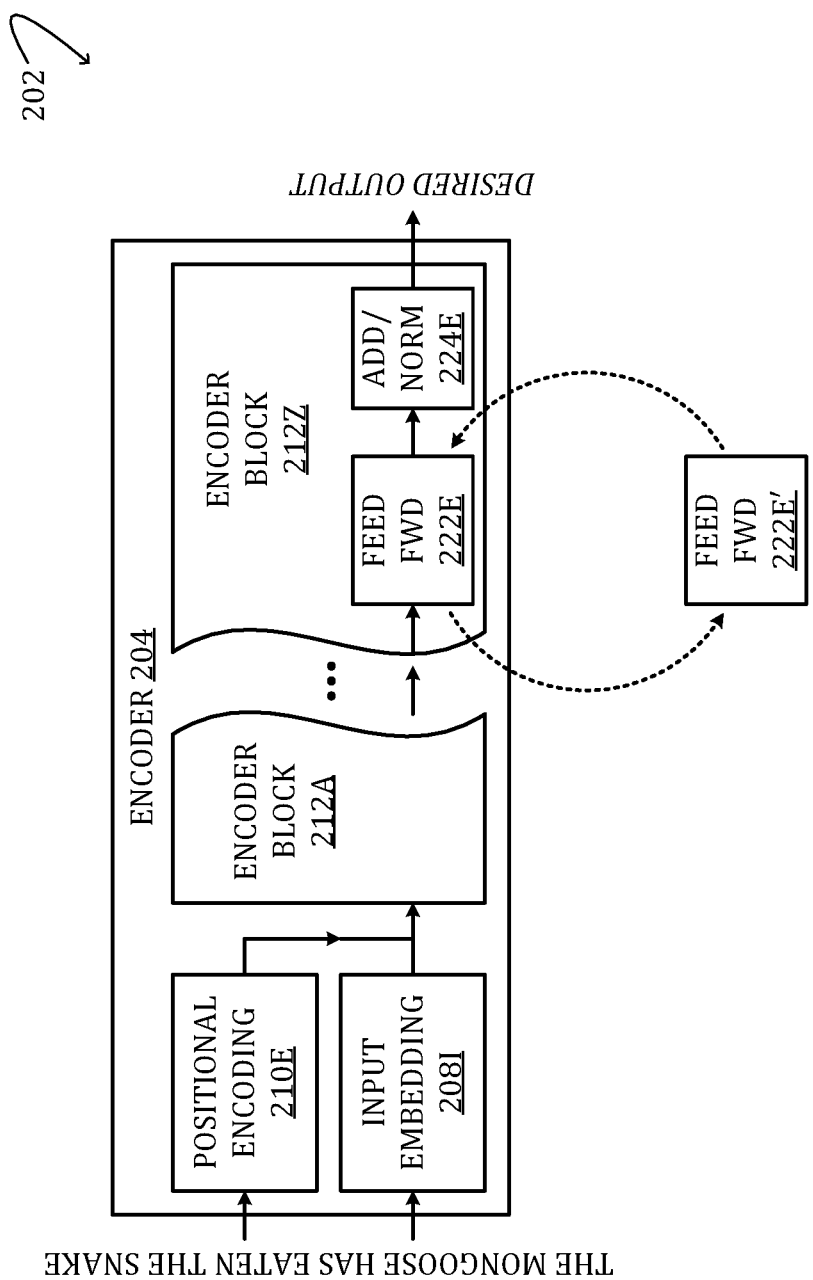
FIGS. 2 and 3 are simplified block diagrams of example transformer-based language models each comprising an encoder.

A transformer-based language model with no encoder or no decoder may yet preserve the benefits of two-phase training as noted above. In example language model 202 of FIG. 2, which comprises a series of linked encoder blocks 212, all of the necessary decoder-like functionality (e.g., output sequencing) may be provided by feed-forward neural network 222E. The series of encoder blocks of this language model may be trained on various interpretive tasks during an extensive, unsupervised pretraining phase as described above. Thereafter, feed-forward neural network 222E may be trained on a specific output task during a much faster, supervised fine-tuning phase. Furthermore, pretrained language model 202 may be repurposed for a totally different output task merely by substituting a differently configured (or differently trained) feed-forward neural network 222E', repeating only the fine-tuning training phase while leaving in place the parameter values fixed by the pretraining. In some examples it is necessary to replace only the output layers of the feed-forward neural network to realize a different NLU operation. Thus, a model trained to answer English language questions can be repurposed to translate from English to French, for example.

Figure 3:
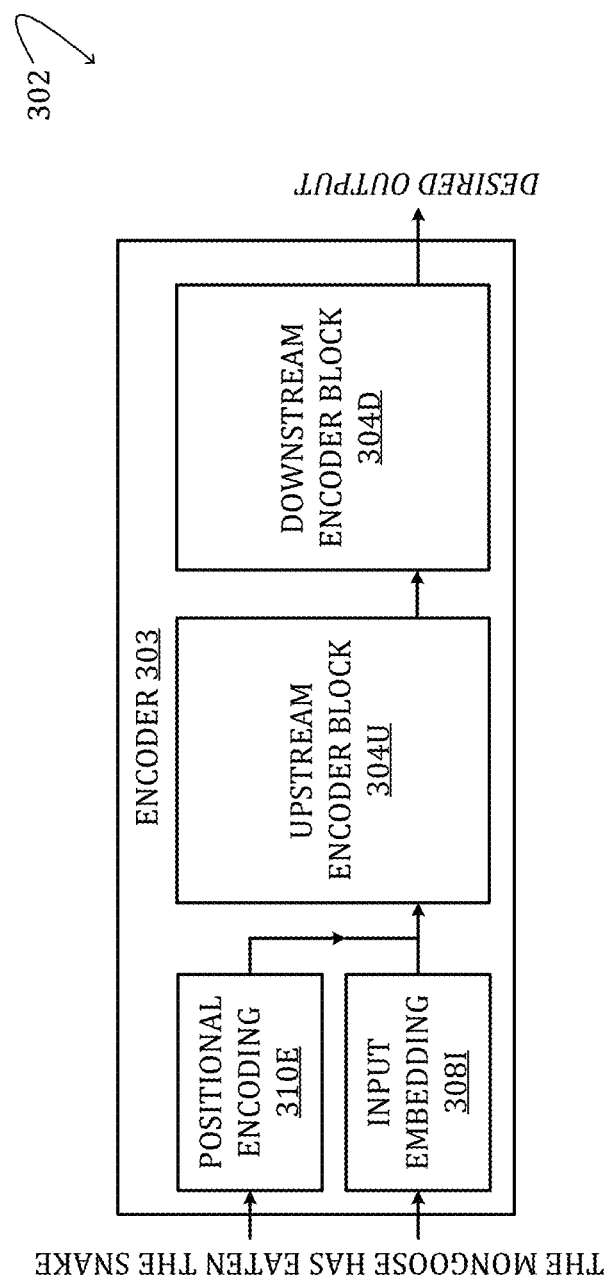

In light of the context above, the balance of this disclosure relates primarily to training a transformer-based language model, such as example language model 302 of FIG. 3. The illustrated encoder 303 includes two encoders-upstream encoder 304U and downstream encoder 304D. The upstream and downstream encoders are configured to execute collectively a multitask pretraining problem, of which numerous variants are envisaged.

Figure 4:
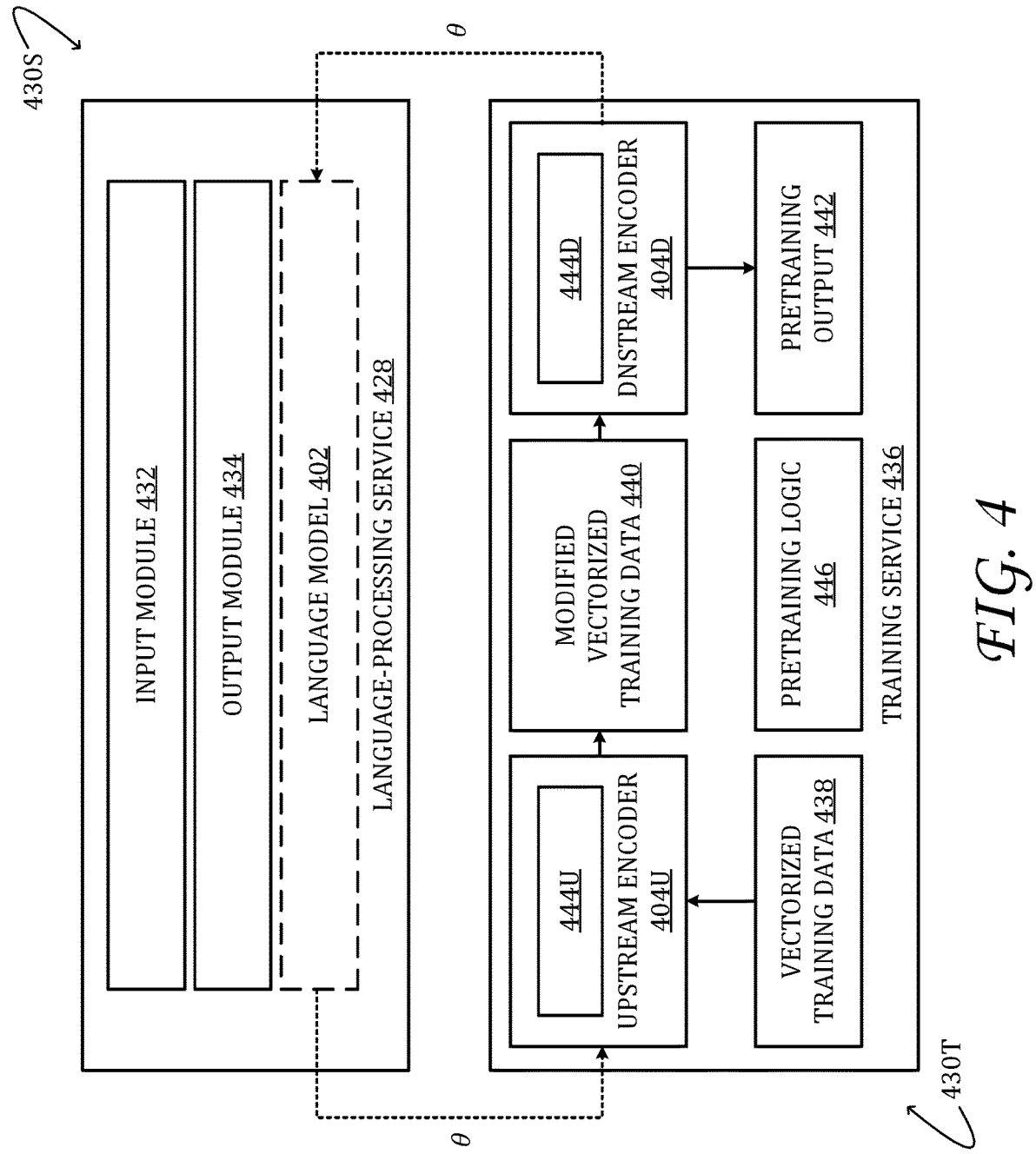
FIG. 4 shows aspects of an example language-processing service based on a transformer-based language model and an example training service configured to pretrain the model.

FIG. 4 shows aspects of an example application context for the language models introduced above. In particular, FIG. 4 shows aspects of an example language-processing service 428. As used herein, a 'language-processing service' is a computer-program product that receives as input a representation of human language (e.g., text) and emits or exposes a useful output. The nature of the output may vary from one application to another. For example, some language-processing services translate text from English to French. Other language-processing services receive a question in the form of a textual query and attempt to supply an answer based on a corpus of reference data. In these and other examples, the language-processing service comprises a language model trained in advance of receiving the input. As appropriate language models comprise machine-learning constructs—artificial neural networks, and the like, the act of training amounts to fixing certain adjustable parameter values in the model, pursuant to feeding the model a large corpus of training data according to known methods of supervised, semi-supervised, and/or unsupervised machine learning.

Language-processing service 428 of FIG. 4 is installed on server computer system 430S. In other examples the language-processing service may be installed on a desktop, laptop, tablet, or wearable computer, on a smartphone or game system, or on virtually any suitable computer device. Language-processing service 428 includes language model 402, a trainable model configured to execute one or more NLU tasks. Example NLU tasks include automated reasoning, machine translation, question answering, natural-language inference, named-entity recognition (NER), and text summarization, among others. In some examples the language model is a transformer-based model comprising a series of connected encoder and/or decoder blocks. In some examples, the language model incorporates disentangled attention (vide infra).

Language-processing service 428 of FIG. 4 also includes input module 432 configured to convey language input to the language model, and output module 434 configured to expose an output of the language model. In some examples the input and output modules may link the 'back end' of the language processing service, where AI is enacted, to the 'front end' of the language processing service, where input is received from network client devices and output is routed to network client devices. In non-network examples, the input and output modules may receive and send language input to a device operating system, for instance. In the examples disclosed herein, language model 402 is trained, prior to receiving language input, via training service 436, which executes on training computer system 430T. A 'training service' refers herein to computer software configured to achieve, maintain, or adjust the training of a language model. In many NLU examples, the pretraining process enacted by a training service is a multitask optimization. In particular, the language model may include separate function blocks that execute cooperatively, using certain shared parameters and/or shared data embeddings. Such modules are pretrained together by the training service, so that the shared parameters and/or embeddings are optimized globally. This disclosure describes a training service and corresponding method for multitask pretraining of a transformer-based language model. The disclosed training service and method are scalable to high capacity, with a manageable number of parameters, and are shown to significantly exceed the training efficiencies of previous models, for several important NLU tasks. In most cases, energy use varies directly with parameter depth and inversely with training efficiency. Generally speaking, a language model may be pretrained on a large volume of training text so as to learn contextual word representations. Wikipedia or BookCorpus may be used as a source of training text, for example. Optionally the training text may include multilingual text.

Language model 402 includes an upstream sequence of transformer blocks—upstream encoder 404U in the example illustrated in FIG. 4. Likewise, the language model includes a downstream sequence of transformer blocks—downstream encoder 404D in the illustrated example. Based on the functions of positional-encoding module 310E and input-embedding module 308I (vide supra), upstream encoder 404U is configured to receive vectorized training data 438 and to emit modified vectorized training data 440. Downstream encoder 404D is configured to receive the modified vectorized training data 440 and to emit pretraining output 442.

In some examples, the pretraining of language model 402 may be enacted under a self-supervision objective, such as masked-language modeling (MLM). For instance, a sequence of tokens $X=\{x_i\}$ is corrupted into a corrupted sequence of tokens $\tilde{X}$ by masking 15% of its tokens at random and then training a language model parameterized by parameters $\theta$ to reconstruct the original sequence $X$, by predicting the masked tokens $\tilde{x}$ conditioned on the corrupted sequence $\tilde{X}$:

$$\max_{\theta} \log p_\theta(X|\tilde{X}) = \max_{\theta} \sum_{i \in C} \log p_\theta(\tilde{x}_i = x_i | \tilde{X}), \quad (1)$$

where $\mathcal{C}$ is the index set of the masked tokens in the sequence. In some examples 10% of the masked tokens may remain unchanged, another 10% may be replaced with randomly selected tokens, and the rest may be replaced with the [MASK] token.

Some language models (e.g., BERT) use only one transformer encoder to predict corrupted tokens under MLM. Other language models (e.g., ELECTRA) use two encoders akin to generative adversarial networks (GAN). The upstream encoder is a generator configured to generate ambiguous corruptions and trained using MLM. The downstream encoder is a discriminator configured to distinguish the ambiguous tokens from the original inputs and trained using a token-level binary classifier. The generator generates ambiguous tokens to replace masked tokens in the input sequence. Then the modified input sequence is fed to the discriminator. The binary classifier in the discriminator determines whether a corresponding token is an original token or a token replaced by the generator. The symbols $\theta_G$ and $\theta_D$ are used herein to represent the parameters of the generator and the discriminator, respectively. The training objective in the discriminator is called replaced token detection (RTD). The loss function of the generator can be written as $$L_{MLM} = \mathbb{E}\left(-\sum_{i \in \mathcal{C}} \log p_{\theta_G}(\tilde{x}_{i,G} = x_i | \tilde{X}_G)\right), \quad (2)$$

where the uncorrupted token sequence $\tilde{X}_G$ is the input to the generator by randomly masking 15% tokens in the original token sequence X.

The input sequence of the discriminator is constructed by replacing masked tokens with new tokens sampled according to the output probability from the generator:

$$\tilde{x}_{i,D} = \begin{cases} \hat{x}_i \sim p_{\theta_G}(\tilde{x}_{i,G} = x_i | \tilde{X}_G), & i \in \mathcal{C} \\ x_i, & i \notin \mathcal{C} \end{cases} \quad (3)$$

The loss function of the discriminator is written as $$L_{RTD} = \mathbb{E}\left(-\sum_i \log p_{\theta_D}(\mathbb{1}(\tilde{x}_{i,D} = x_i) | \tilde{X}_D, i)\right), \quad (4)$$

where $\mathbb{1}(\cdot)$ is the indicator function and the token sequence $\tilde{X}_D$ is the input to the discriminator constructed via Equation 3. In ELECTRA, the MLM loss $L_{MLM}$ and the RTD loss $L_{RTD}$ are optimized jointly, $L = L_{MLM} + \lambda L_{RTD}$, where $\lambda$ is the weight of the discriminator loss $L_{RTD}$, which may be set to 50.

In examples as illustrated above, vectorized training data 438 in FIG. 4 comprises non-masked data, and modified vectorized training data 440 comprises masked data. In accordance with the description above, upstream encoder 404U may comprise a generator of the masked data, and downstream encoder 404D may comprise a discriminator operating on the masked data. Here the generator is configured to generate ambiguous corruptions in the non-masked data, and the discriminator is configured to distinguish the ambiguous corruptions from tokens originally present in the non-masked data. Stated another way, pretraining output 442 indicates whether each of a plurality of tokens of the masked data is originally present in the non-masked data or is a token replaced by the generator.

Continuing in FIG. 4, upstream encoder 404U includes an upstream data embedding 444U, and downstream encoder 404D includes a downstream data embedding 444D. In some examples each data embedding is a token embedding, and the discriminator is configured to execute replaced token detection (RTD), as indicated above. In more particular examples the generator and the discriminator each comprise a neural network, and the generator has half a depth of the discriminator and a full width of the discriminator.

Upstream data embedding 444U and downstream data embedding 444D are equivalent; however, the performance of language model 402 may be further improved by replacing token embedding sharing (ES), as used in previous RTD implementations, by gradient-disentangled embedding sharing (GDES). In executing GDES, pretraining logic 446 is configured to adjust the upstream data embedding and the downstream data embedding by computing a gradient of the upstream data embedding disentangled from a gradient of the downstream data embedding.

Figure 5C:
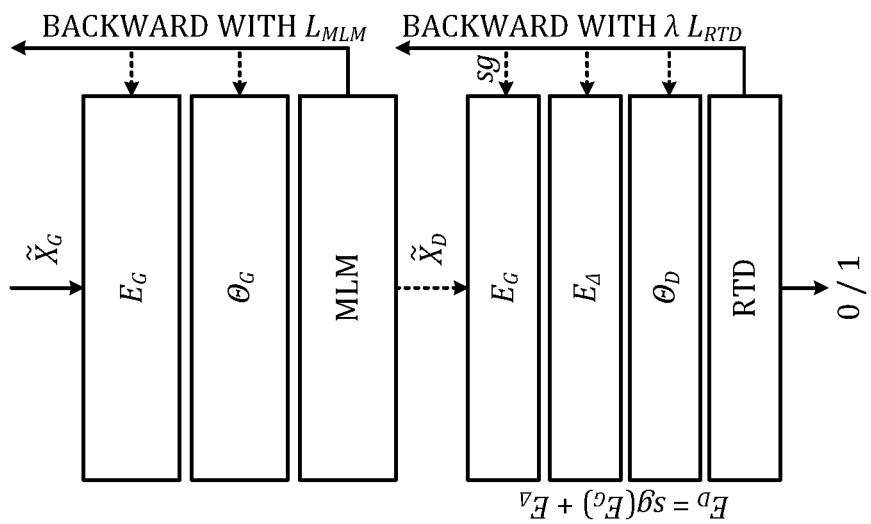
FIG. 5C shows aspects of example pretraining of a transformer-based language-model encoder using gradient-disentangled embedded sharing (GDES).
Figure 5B:
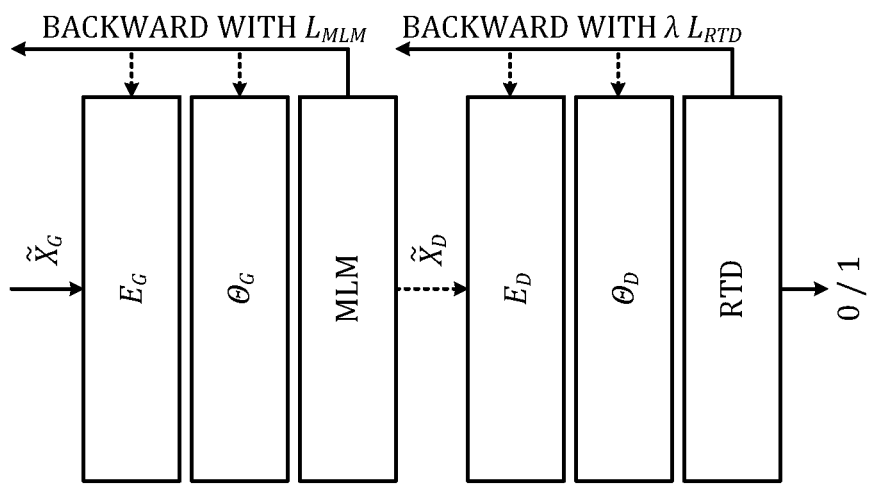
FIG. 5B shows aspects of example pretraining of a transformer-based language-model encoder using 'no embedded sharing' (NES).
Figure 5A:
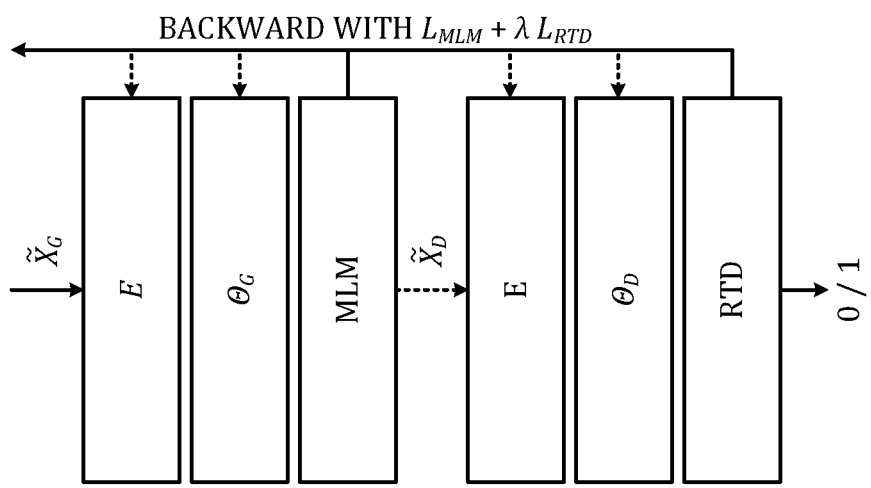
FIG. 5A shows aspects of example pretraining of a transformer-based language-model encoder using embedded sharing (ES).

This feature is more easily understood with reference to FIGS. 5A through 5C, which show different embedding-sharing methods. FIG. 5A illustrates pretraining under ES, as used by language models having a generator and a discriminator, such as ELECTRA, that share token embeddings. In ES pretraining, embeddings E, generator parameters $\theta_G$ and discriminator parameters $\theta_D$ are jointly updated in a single backward pass with respect to the MLM loss plus a weighted RTD loss, $L_{MLM} + \lambda L_{RTD}$. In this expression, $L_{MLM}$ refers to the masked language model loss, $L_{RTD}$ refers to the replaced token detection (RTD) loss, and A is the weight for RTD loss. Let E and $g_E$ denote the parameters and the gradients of the token embeddings, respectively. In each training pass of ELECTRA, the gradients of the token embeddings $g_E$ is computed by back-propagation using accumulated errors with respect to both the MLM loss of the generator and the RTD loss of the discriminator, respectively, as $$g_E = \frac{\partial L_{MLM}}{\partial E} + \lambda \frac{\partial L_{RTD}}{\partial E}. \quad (5)$$

Equation 5 defines the multitask learning problem, where the gradients from both tasks—e.g., the MLM task of the generator and the RTD task of the discriminator—drive the optimization. Unfortunately, opposing gradients may result in a tug-of-war dynamic, which settles slowly to equilibrium with careful control of the speed of parameter update (e.g., by using a small learning rate or gradient clipping). However, the training can be highly inefficient, as the two different gradients typically force the parameters to be updated in opposing directions. More specifically, the MLM used for training the generator tries to map the tokens that are semantically similar to embedding vectors that are close to each other. On the other hand, the RTD of the discriminator tries to discriminate semantically similar tokens, pulling their embeddings as far apart as possible to optimize binary classification accuracy.

This hypothesis was verified experimentally by implementing a variant of ELECTRA without any token ES, referred to herein as the 'no embedding sharing (NES) method. That variant is illustrated in FIG. 5B, where the generator embeddings $E_G$ and the discriminator parameters $\theta_D$ first update via the backward pass with respect to the MLM loss Liam, and then Ea, the differences between the generator and discriminator embeddings, and the discriminator parameters $\theta_D$ update via the backward pass with respect to $\lambda$ $L_{RTD}$, the weighted RTD loss. In each training pass in NES, the generator and discriminator are updated alternately. Specifically, a forward pass is first run with the generator to generate inputs for the discriminator, and then a backward pass is run with respect to the MLM loss $L_{MLM}$ to update the parameters of the generator, including its token embeddings $E_G$. After that, a forward pass is run for the discriminator, using the inputs produced by the generator, and then a backward pass is run with respect to the RTD loss $L_{RTD}$ to update the discriminator, including its token embeddings $E_D$. It was shown that NES does converge faster than ES. This is expected because NES does not suffer from training inefficiency due to the tug-of-war dynamics as in ES.

Nevertheless, it was also shown that the separated embeddings for the generator and the discriminator in NES results in significant performance degradation on fine tuning the discriminator for downstream tasks. Moreover, the resulting fully trained language model is overall less performant, due presumably to the fact that the embeddings of the generator are beneficial to produce a better discriminator. These factors underscore the merit of some form of embedding sharing. To seek a tradeoff, the strategy herein is to implement a novel gradient-disentangled embedding sharing (GDES) method, where the generator shares its embeddings with the discriminator but stops the gradients in the discriminator from back propagating to the generator embeddings. This avoids the tug-of-war dynamics noted above. It is shown empirically herein that GDES improves both pretraining efficiency and the quality of the pretrained models.

Accordingly, a gradient-disentangled embedding sharing (GDES) method is illustrated in FIG. 5C, where the generator embeddings $E_G$ and the generator parameters $\theta_G$ are first updated in the backward pass with respect to the MLM loss Liam, then the difference in the embeddings $E_\Delta$ and the discriminator parameters $\theta_D$ are updated via the backward pass with respect to $\lambda$ $L_{RTD}$, the weighted RTD loss and the generator embeddings $E_G$. The symbol 'sg' refers to a stop-gradient operator that prevents the discriminator from updating the generator embeddings $E_G$. Like ES in FIG. 5A, token embeddings are shared between the generator and the discriminator, so as to retain the strengths of ES. The sharing is restricted throughout the model pretraining, however. In each training iteration, the gradients of the generator are computed only based on the MLM loss, but not on the RTD loss, thereby avoiding the tug-of-war dynamic and allowing the model to be trained as efficiently as NES. Unlike ES, the sharing in GDES is one-directional in that the gradients computed with respect to MLM are used for updating both the generator embeddings $E_G$ and the discriminator embeddings $E_D$. By contrast, the gradients computed with respect to RTD are used for updating the discriminator embeddings $E_D$ only. In this manner, pretraining logic 446 of FIG. 4 suppresses back propagation of the gradient of the downstream data embedding into the upstream data embedding.

GDES is implemented by re-parameterizing the token embeddings of the discriminator as $$E_D = sg(E_G) + E_\Delta, \quad (6)$$

where sg is a stop-gradient operator, which only allows gradient propagation through $E_\Delta$.

The training of GDES follows that of NES. The difference between the discriminator and the generator embeddings $E_\Delta$ is initialized as a zero matrix. In each training pass, a forward pass with the generator is run first, to generate the inputs for the discriminator, and then a backward pass is run with respect to the MLM loss to update the generator embeddings $E_G$, which is shared by both the generator and the discriminator. After that, a forward pass for the discriminator is run using the inputs produced by the generator, a backward pass is run with respect to the RTD loss to update the discriminator embeddings $E_D$ by propagating gradients only through the embedding differences $E_\Delta$. After model training, the embedding differences $E_\Delta$ are added to the generator embeddings $E_G$ and the sum is saved as the discriminator embeddings $E_D$ in the discriminator, as in Equation 6.

Figure 6:
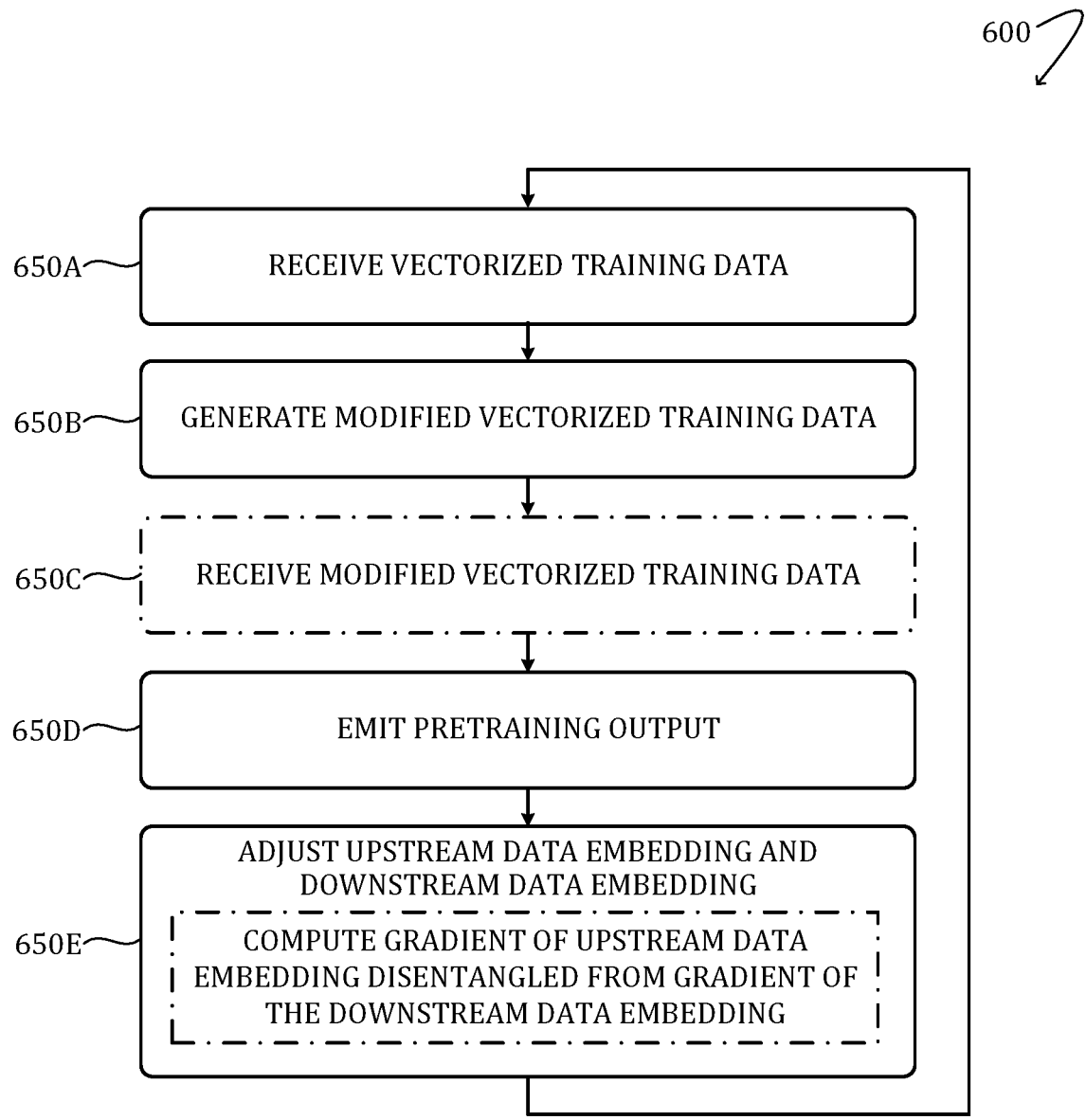
FIG. 6 shows aspects of an example method for training a transformer-based language-model encoder.

FIG. 6 shows aspects of an example method 600 for training a language model of a language-processing service. For ease of illustration, the method follows the functionality of the configurations detailed above.

At 650A of method 600 vectorized training data is received as input to a multitask pretraining problem. In some examples the vectorized training data comprises non-masked data. In some examples the vectorized training data is received in an upstream encoder having an upstream data embedding. As noted hereinabove, an upstream encoder can be configured to maintain an upstream data embedding. At 650B, accordingly, the upstream encoder or other transformer structure may processes the vectorized training data to generate modified vectorized training data based on the vectorized training data. The modified vectorized training data is generated according to the upstream data embedding. In some examples the modified vectorized training data comprises masked data. The masked data may result from random masking of tokens of the non-masked data, for instance. Accordingly, the upstream encoder, where employed, may comprise a generator of the masked data. The generator may be configured to generate ambiguous corruptions in the non-masked data.

At 650C, in some examples, a downstream encoder of the language model receives the modified vectorized training data. As noted hereinabove a downstream encoder can be configured to maintain a downstream data embedding which is equivalent to the upstream data embedding. At 650D the modified vectorized training data is processed and pretraining output based on the modified vectorized training data is emitted. In the downstream encoder, for example, the modified vectorized training data is processed according to a downstream data embedding which is equivalent to the upstream data embedding. In some examples the downstream encoder comprises a discriminator operating on the masked data. In some examples, each data embedding is a token embedding, and the discriminator is configured to execute replaced token detection (RTD).

In examples in which the generator is configured to generate ambiguous corruptions in the non-masked data, the discriminator may be configured to distinguish the ambiguous corruptions from tokens originally present in the non-masked data. In other words, the pretraining output from the discriminator may indicate whether each of a plurality of tokens of the masked data is originally present in the non-masked data or is replaced by the generator. At 650E pretraining logic of the training service adjusts the upstream data embedding and the downstream data embedding by computing, based on the pretraining output, a gradient of the upstream data embedding disentangled from a gradient of the downstream data embedding. This action, which may be enacted iteratively, advances the multitask pretraining problem toward a pretrained state. The adjustment may be enacted according to the GDES algorithm presented hereinabove.

No aspect of the foregoing drawings or description should be interpreted in a limiting sense, because numerous variations, additions, and omissions are also envisaged. For instance, while FIG. 4 shows upstream and downstream encoders configured to enact generator and discriminator tasks, respectively, these functions may also be enacted by sequences of transformer blocks that differ in some respects from encoder architecture. Furthermore, some transformer-based language models building on BERT may provide enhancements such as disentangled attention and an enhanced mask decoder. The disentangled-attention mechanism represents each input word using two separate vectors: one for the content and another for the position. Its attention weights among words are computed via disentangled matrices on both their contents and relative positions. The disentangled attention mechanism considers the contents and relative positions of the context words, but not the absolute positions of these words, which in many cases are relevant for the prediction. The enhanced mask decoder improves MLM by adding absolute position information of the context words at the MLM decoding layer.

Furthermore, while the above descriptions of training service 436 and training method 600 focus primarily on pretraining features, that omission should not be taken to mean that the service and method are not directly extensible to subsequent fine-tuning of the language model for particular NLU operations. On the contrary, various fine-tuning features may be added to the training service and method and enacted subsequent to the pretraining. Fine-tuning of a transformer-based language model is typically enacted on linked encoder-decoder assemblies or on encoders having decoder-like functionality built into an output layer—e.g., an output layer of a terminal feed-forward neural network. Unlike pretraining, which is unsupervised and enables an encoder to interpret language input in a generic sense, the fine tuning may be a may be supervised or semi-supervised and tailored to a specific NLU task. In training services and training methods offering both pretraining and fine tuning, the fine tuning may be a comparatively less time-intensive process and may be repeated with different training data, as desired, in order to fine tune the language model for different NLU tasks.

As noted above, the methods herein may be tied to a computer system of one or more computing devices. Such methods and processes may be implemented as an application program or service, an application programming interface (API), a library, and/or other computer-program product.

Figure 7:
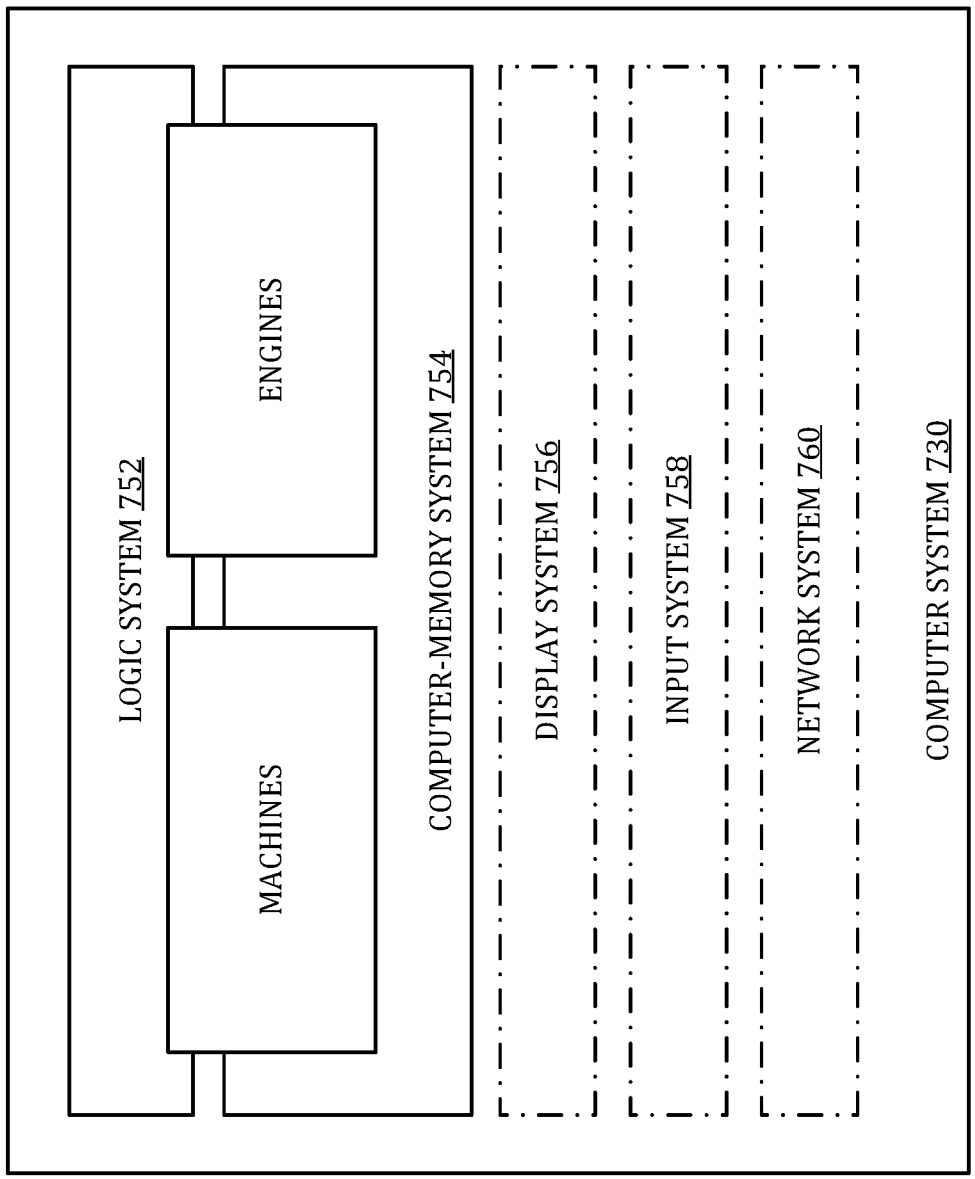
FIG. 7 shows aspects of an example computer system.

FIG. 7 provides a schematic representation of a computer system 730 configured to provide some or all of the computer system functionality disclosed herein. Computer system 730 may take the form of a personal computer, application-server computer system, or any other computing device.

Computer system 730 includes a logic system 752 and a computer-memory system 754. Computer system 730 may optionally include a display system 756, an input system 758, a network system 760, and/or other systems not shown in the drawings.

Logic system 752 includes one or more physical devices configured to execute instructions. For example, the logic system may be configured to execute instructions that are part of at least one operating system (OS), application, service, and/or other program construct. The logic system may include at least one hardware processor (e.g., microprocessor, central processor, central processing unit (CPU) and/or graphics processing unit (GPU)) configured to execute software instructions. Additionally or alternatively, the logic system may include at least one hardware or firmware device configured to execute hardware or firmware instructions. A processor of the logic system may be single-core or multi-core, and the instructions executed thereon may be configured for sequential, parallel, and/or distributed processing. Individual components of the logic system optionally may be distributed among two or more separate devices, which may be remotely located and/or configured for coordinated processing. Aspects of the logic system may be virtualized and executed by remotely-accessible, networked computing devices configured in a cloud-computing configuration.

Computer-memory system 754 includes at least one physical device configured to temporarily and/or permanently hold computer system information, such as data and instructions executable by logic system 752. When the computer-memory system includes two or more devices, the devices may be collocated or remotely located. Computer-memory system 754 may include at least one volatile, nonvolatile, dynamic, static, read/write, read-only, random-access, sequential-access, location-read addressable, file-read addressable, and/or content-read addressable computer-memory device. Computer-memory system 754 may include at least one removable and/or built-in computer-memory device. When the logic system executes instructions, the state of computer-memory system 754 may be transformed—e.g., to hold different data.

Aspects of logic system 752 and computer-memory system 754 may be integrated together into one or more hardware-logic components. Any such hardware-logic component may include at least one program- or application-specific integrated circuit (PASIC/ASIC), program- or application-specific standard product (PSSP/ASSP), system-on-a-chip (SOC), or complex programmable logic device (CPLD), for example.

Logic system 752 and computer-memory system 754 may cooperate to instantiate one or more logic machines or engines. As used herein, the terms 'machine' and 'engine' each refer collectively to a combination of cooperating hardware, firmware, software, instructions, and/or any other components that provide computer system functionality. In other words, machines and engines are never abstract ideas and always have a tangible form. A machine or engine may be instantiated by a single computing device, or a machine or engine may include two or more subcomponents instantiated by two or more different computing devices. In some implementations, a machine or engine includes a local component (e.g., a software application executed by a computer system processor) cooperating with a remote component (e.g., a cloud computing service provided by a network of one or more server computer system systems). The software and/or other instructions that give a particular machine or engine its functionality may optionally be saved as one or more unexecuted modules on one or more computer-memory devices.

Machines and engines (as used throughout the above description) may be implemented using any suitable combination of machine learning (ML) and artificial intelligence (AI) techniques. Non-limiting examples of techniques that may be incorporated in an implementation of one or more machines include support vector machines, multi-layer neural networks, convolutional neural networks (e.g., spatial convolutional networks for processing images and/or video, and/or any other suitable convolutional neural network configured to convolve and pool features across one or more temporal and/or spatial dimensions), recurrent neural networks (e.g., long short-term memory networks), associative memories (e.g., lookup tables, hash tables, bloom filters, neural Turing machines and/or neural random-access memory) unsupervised spatial and/or clustering methods (e.g., nearest neighbor algorithms, topological data analysis, and/or k-means clustering), and/or graphical models (e.g., (hidden) Markov models, Markov random fields, (hidden) conditional random fields, and/or AI knowledge bases)).

When included, display system 756 may be used to present a visual representation of data held by computer-memory system 754. The visual representation may take the form of a graphical user interface (GUI) in some examples. The display system may include one or more display devices utilizing virtually any type of technology. In some implementations, display system may include one or more virtual-, augmented-, or mixed reality displays.

When included, input system 758 may comprise or interface with one or more input devices. An input device may include a sensor device or a user input device. Examples of user input devices include a keyboard, mouse, or touch screen.

When included, network system 760 may be configured to communicatively couple computer system 730 with one or more other computer systems. The network system may include wired and/or wireless communication devices compatible with one or more different communication protocols. The network system may be configured for communication via personal-, local- and/or wide-area networks.

Figure 8:
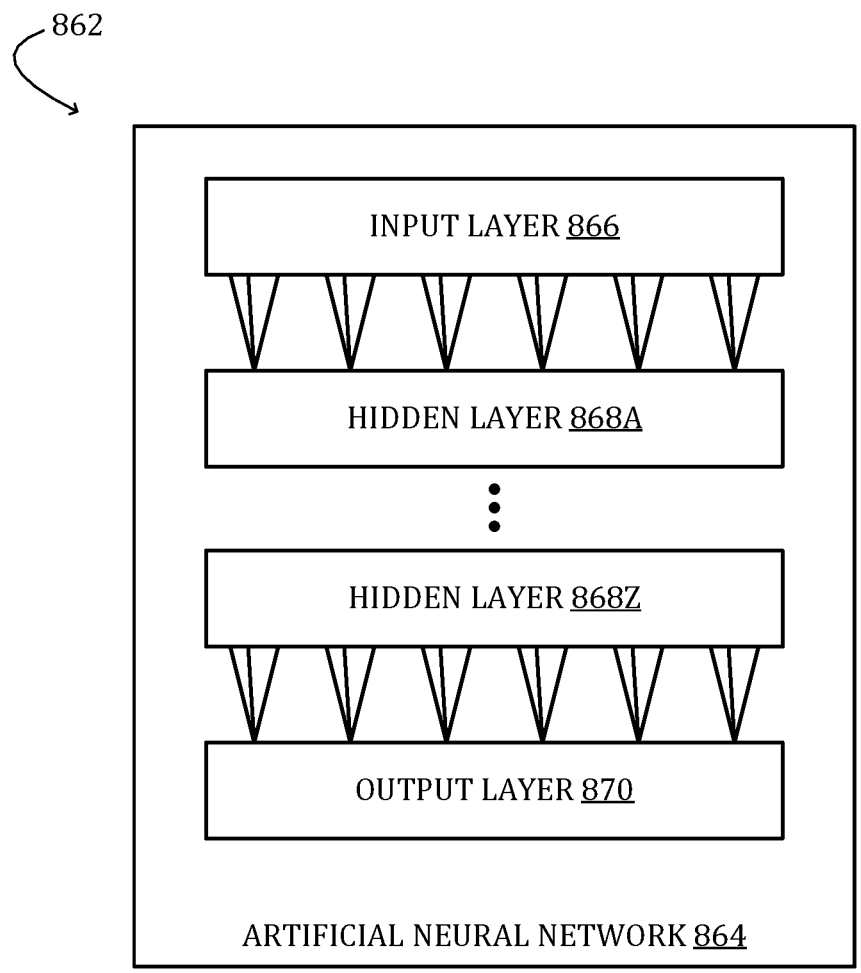
FIG. 8 shows aspects of an example artificial neural network.

The language models herein may comprise one or more trainable machines. FIG. 8 shows aspects of an example trainable machine 862. Trainable machine 862 is based on an artificial neural network 864 having an input layer 866, a series of hidden layers 868, and an output layer 870. Each layer of the artificial neural network includes an array of logic constructs called 'neurons'. During operation of the trainable machine, each input value S, is received at the node of input layer 866 and is transformed successively through each of the series of hidden layers 868. Each neuron of a hidden layer receives its input from neurons of the layer above, enacts a logic operation on the input, and passes an output to neurons of the layer below. Each neuron of output layer 870 provides a classification label C, that is attached to the respective neuron. In contrast to the neurons of a generic neural network, each neuron of artificial neural network 864 receives input only from the neuron directly above it, or from a close neighbor of that neuron.

Among the hidden layers 868 of artificial neural network 864 are one or more convolution, or filter, layers. Each convolution layer enacts a filtering operation by computing a dot product between its vector of inputs and a filter vector of the same dimensions. The elements of each filter vector are adjustable parameters called 'filter weights'. During training of the artificial neural network, the filter weights are optimized in a closed-loop manner, so as to cause the artificial neural network to converge onto known, ground-truth classifications from a set of training data provided as input. More specifically, a global error is computed for classification of the contributing training data based on a trial set of filter weights, by comparing the output versus the ground-truth classifications. Then each filter weight is adjusted so as to reduce the global error in a process known as back propagation. To facilitate back propagation, the filtering and/or other logic function enacted by each neuron may be required to be differentiable with respect to an associated filter weight. In some examples, each neuron may include logic configured to compute its own derivatives. Such derivatives may be used in a parameter optimization procedure, such as the 'steepest descent' method, among others. artificial neural network 864 may include a large number of filters arranged in hidden layers 868. Provided that a sufficient quantity of labeled training data is made available during the training phase, a artificial neural network can potentially learn to cope with non-idealities in training data.

In conclusion, one aspect of this disclosure is directed to a language-model training service comprising a language model and pretraining logic. The language model includes an upstream encoder configured to receive vectorized training data and emit modified vectorized training data, and a downstream encoder configured to receive the modified vectorized training data and emit pretraining output. The upstream encoder includes an upstream data embedding, and the downstream encoder includes a downstream data embedding equivalent to the upstream data embedding. The pretraining logic is configured to adjust the upstream data embedding and the downstream data embedding by computing a gradient of the upstream data embedding disentangled from a gradient of the downstream data embedding. This approach offers the technical benefit of preserving equivalence between the upstream and downstream data embeddings, for strong model performance, while preventing the upstream and downstream encoders from pulling the embeddings in opposite directions, which degrades training efficiency. This technical benefit has the effect of reducing consumption of computing resources. The more particular implementations outlined below provide additional technical effects of math for a specific technical purpose or implementation— e.g., providing generation of masked input data and discrimination of the source of masked tokens.

In some implementations, the vectorized training data comprises non-masked data, the modified vectorized training data comprises masked data, the upstream encoder comprises a generator of the masked data, and the downstream encoder comprises a discriminator operating on the masked data. In some implementations, the pretraining output indicates whether each of a plurality of tokens of the masked data is originally present in the non-masked data or is replaced by the generator. In some implementations, the generator is configured to generate ambiguous corruptions in the non-masked data, and the discriminator is configured to distinguish the ambiguous corruptions from tokens originally present in the non-masked data. In some implementations, each data embedding is a token embedding, and the discriminator is configured to execute replaced token detection (RTD). In some implementations, the generator and the discriminator each comprise a neural network, and the generator has half a depth of the discriminator and a full width of the discriminator. In some implementations, the pretraining logic suppresses back propagation of the gradient of the downstream data embedding into the upstream data embedding. In some implementations, the upstream and downstream encoders are configured to execute collectively a multitask pretraining problem.

Another aspect of this disclosure is directed to a language-processing service configured for natural language understanding (NLU). The language-processing service comprises a language model, an input module, and an output module. The language model includes an upstream sequence of transformer blocks configured to receive vectorized training data and emit modified vectorized training data during pretraining, and a downstream sequence of transformer blocks configured to receive the modified vectorized training data and emit pretraining output during the pretraining. The upstream sequence of transformer blocks includes an upstream data embedding, and the downstream encoder includes a downstream data embedding equivalent to the upstream data embedding. Pretraining logic operative during the pretraining is configured to adjust the upstream data embedding and the downstream data embedding by computing a gradient of the upstream data embedding disentangled from a gradient of the downstream data embedding, and the upstream and downstream sequences of transformer blocks are configured to execute collectively a multitask pretraining problem. The input module is configured to convey language input to the language-processing model, and the output module is configured to expose an output of the language-processing model.

In some implementations, the upstream the sequence of transformer blocks comprises an upstream encoder, and the downstream sequence of transformer blocks comprises a downstream encoder. In some implementations, the NLU includes one or more of question answering, natural language inference, and named-entity recognition. In some implementations, the at least one of the upstream and downstream sequences of transformer blocks provide disentangled attention over a plurality of encodings. In some implementations, the vectorized training data includes multilingual training data. In some implementations, the vectorized training data comprises non-masked data, the modified vectorized training data comprises masked data, the upstream sequence of transformer blocks comprises a generator of the masked data, and the downstream sequence of transformer blocks comprises a discriminator operating on the masked data. In some implementations, the pretraining output indicates whether each of a plurality of tokens of the masked data is originally present in the non-masked data or is replaced by the generator.

Another aspect of this disclosure is directed to a method for training a language model. The method comprises: (a) receiving vectorized training data as input to a multitask pretraining problem; (b) generating modified vectorized training data based on the vectorized training data, according to an upstream data embedding; (c) emitting pretraining output based on the modified vectorized training data, according to a downstream data embedding equivalent to the upstream data embedding; and (d) adjusting the upstream data embedding and the downstream data embedding by computing, based on the pretraining output, a gradient of the upstream data embedding disentangled from a gradient of the downstream data embedding, thereby advancing the multitask pretraining problem toward a pretrained state.

In some implementations, the vectorized training data comprises non-masked data, and the modified vectorized training data comprises masked data. In some implementations, the pretraining output indicates whether each of a plurality of tokens of the masked data is originally present in the non-masked data. In some implementations, generating the modified vectorized training data includes generating ambiguous corruptions in the non-masked data, and the pretraining output distinguishes the ambiguous corruptions from tokens originally present in the non-masked data. In some implementations, each data embedding is a token embedding, and the pretraining output is a product of replaced token detection (RTD).

This disclosure is presented by way of example and with reference to the attached drawing figures. Components, process steps, and other elements that may be substantially the same in one or more of the figures are identified coordinately and described with minimal repetition. It will be noted, however, that elements identified coordinately may also differ to some degree. It will be further noted that the figures are schematic and generally not drawn to scale. Rather, the various drawing scales, aspect ratios, and numbers of components shown in the figures may be purposely distorted to make certain features or relationships easier to see.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A computer system configured as a language-model training service, the computer system comprising:
  a language model hosted in the computer system, the language model including:
    an upstream encoder configured to receive vectorized training data and emit modified vectorized training data, the upstream encoder including an upstream data embedding, and
    a downstream encoder configured to receive the modified vectorized training data and emit pretraining output, the downstream encoder including a downstream data embedding equivalent to the upstream data embedding; and
  pretraining logic configured to adjust the upstream data embedding and the downstream data embedding by computing a gradient of the upstream data embedding disentangled from a gradient of the downstream data embedding, wherein the gradient of the upstream data embedding is computed based on a loss function of the upstream encoder and not on a loss function of the downstream encoder, and wherein the gradient of the downstream data embedding is computed based on the loss function of the upstream encoder and the loss function of the downstream encoder.

2. The training service of claim 1 wherein the vectorized training data comprises non-masked data and the modified vectorized training data comprises masked data, wherein the upstream encoder comprises a generator of the masked data, and wherein the downstream encoder comprises a discriminator operating on the masked data.

3. The training service of claim 2 wherein the pretraining output indicates whether each of a plurality of tokens of the masked data is originally present in the non-masked data or is replaced by the generator.

4. The training service of claim 2 wherein the generator is configured to generate ambiguous corruptions in the non-masked data, and wherein the discriminator is configured to distinguish the ambiguous corruptions from tokens originally present in the non-masked data.

5. The training service of claim 2 wherein each data embedding is a token embedding, and wherein the discriminator is configured to execute replaced token detection (RTD).

6. The training service of claim 2 wherein the generator and the discriminator each comprise a neural network, and wherein the generator has half a depth of the discriminator and a full width of the discriminator.

7. The training service of claim 1 wherein the pretraining logic suppresses back propagation of the gradient of the downstream data embedding into the upstream data embedding.

8. The training service of claim 1 wherein the upstream and downstream encoders are configured to execute collectively a multitask pretraining problem.

9. A language-processing service configured for natural language understanding (NLU), the language-processing service comprising:
a language model including:
an upstream sequence of transformer blocks configured to receive vectorized training data and emit modified vectorized training data during pretraining, the upstream sequence of transformer blocks including an upstream data embedding,
a downstream sequence of transformer blocks configured to receive the modified vectorized training data and emit pretraining output during the pretraining, the downstream sequence of transformer blocks including a downstream data embedding equivalent to the upstream data embedding, wherein pretraining logic operative during the pretraining is configured to adjust the upstream data embedding and the downstream data embedding by computing a gradient of the upstream data embedding disentangled from a gradient of the downstream data embedding, wherein the gradient of the upstream data embedding is computed based on a loss function of the upstream sequence of transformer blocks and not on a loss function of the downstream sequence of transformer blocks, and wherein the gradient of the downstream data embedding is computed based on the loss function of the upstream sequence of transformer blocks and the loss function of the downstream sequence of transformer blocks,
wherein the upstream and downstream sequences of transformer blocks are configured to execute collectively a multitask pretraining problem;
an input module configured to convey language input to the language-processing model; and
an output module configured to expose an output of the language-processing model.

10. The language-processing service of claim 9 wherein the upstream sequence of transformer blocks comprises an upstream encoder, and the downstream sequence of transformer blocks comprises a downstream encoder.

11. The language-processing service of claim 9 wherein the NLU includes one or more of question answering, natural language inference, and named-entity recognition.

12. The language-processing service of claim 9 wherein the at least one of the upstream and downstream sequences of transformer blocks provide disentangled attention over a plurality of encodings.

13. The language-processing service of claim 9 wherein the vectorized training data includes multilingual training data.

14. The language-processing service of claim 9 wherein the vectorized training data comprises non-masked data and the modified vectorized training data comprises masked data, wherein the upstream sequence of transformer blocks comprises a generator of the masked data, and wherein the downstream sequence of transformer blocks comprises a discriminator operating on the masked data.

15. The language-processing service of claim 14 wherein the pretraining output indicates whether each of a plurality of tokens of the masked data is originally present in the non-masked data or is replaced by the generator.

16. A method for training a language model, the method comprising:
receiving vectorized training data in an upstream encoder, as input to a multitask pretraining problem;
generating modified vectorized training data in the upstream encoder based on the vectorized training data, according to an upstream data embedding;
emitting pretraining output from a downstream encoder based on the modified vectorized training data, according to a downstream data embedding equivalent to the upstream data embedding; and
adjusting the upstream data embedding and the downstream data embedding in pretraining logic by computing a gradient of the upstream data embedding disentangled from a gradient of the downstream data embedding, thereby advancing the multitask pretraining problem toward a pretrained state, wherein the gradient of the upstream data embedding is computed based on a loss function of the upstream encoder and not on a loss function of the downstream encoder, and wherein the gradient of the downstream data embedding is computed based on the loss function of the upstream encoder and the loss function of the downstream encoder.

17. The method of claim 16 wherein the vectorized training data comprises non-masked data and the modified vectorized training data comprises masked data.

18. The method of claim 17 wherein the pretraining output indicates whether each of a plurality of tokens of the masked data is originally present in the non-masked data.

19. The method of claim 17 wherein generating the modified vectorized training data includes generating ambiguous corruptions in the non-masked data, and wherein the pretraining output distinguishes the ambiguous corruptions from tokens originally present in the non-masked data.

20. The method of claim 17 wherein each data embedding is a token embedding, and wherein the pretraining output is a product of replaced token detection (RTD).

* * * * *